UNITED STATES PATENT OFFICE.

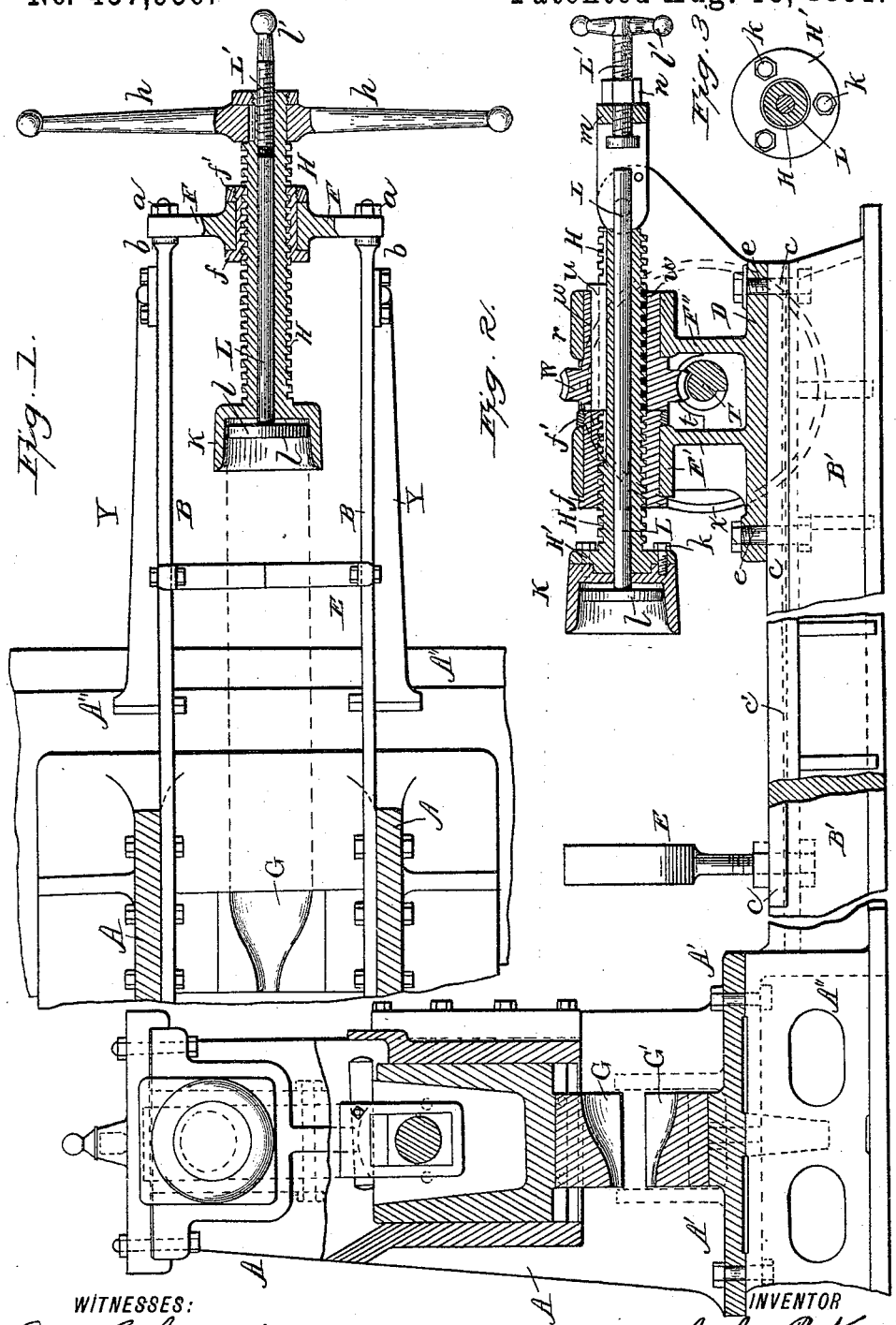

JOHN P. KENNEDY, OF NEW YORK, N. Y.

MACHINE FOR SWAGING THE ENDS OF TUBES.

SPECIFICATION forming part of Letters Patent No. 457,956, dated August 18, 1891.

Application filed February 7, 1891. Serial No. 380,639. (No model.)

*To all whom it may concern:*

Be it known that I, JOHN P. KENNEDY, a citizen of the United States, residing at New York city, in the county of New York and State of New York, have invented certain new and useful Improvements in Machines for Swaging the Ends of Metal Tubes; and I do hereby declare the following to be a full, clear, and exact description of the invention, such as will enable others skilled in the art to which it appertains to make and use the same.

This invention relates to machines for swaging the ends of metal tubes into conical or tapered form, and more particularly to a tube-holder in the form of a chuck having a tapering socket fixed to the end of the feed-screw; to a tube-releasing plunger within the chuck and connected to a rod passing through and fitted to slide longitudinally in the hollow feed-screw, and to means for operating the releasing plunger and rod.

The object of my invention is to provide for conveniently holding one end of a tube while it is rotated and fed forward into a pair of swaging-dies, and also to provide for quickly and readily releasing the tube from the holder after the swaging operation.

My improved devices are adapted for application and use either in a hand-operated machine or a power-machine, and I have shown them in connection with both such forms of swaging-machines in the accompanying drawings, in which—

Figure 1 represents a top plan view, partly in horizontal section, of a hand-operated swaging-machine, showing clearly the tube-holding hollow chuck attached to the end of a feed-screw, the tube-releasing plunger and rod and their operating mechanism forming the subject of this application. Fig. 2 represents a sectional elevation of a power swaging-machine containing my tube holding and releasing devices in connection with the feeding and power-operating mechanism. Fig. 3 represents a sectional detailed view.

In connection with my present improvements I use the same general form of side framing A, bed-plate A', base A'', semi-conical dies G G', and operating mechanism as those described in my patent, No. 368,837, the particular construction and operation of which being well known need no further description here.

Referring now to Fig. 1, the side bars B B for supporting the feeding mechanism and tube to be swaged are bolted at their inner ends to the side frames A A, and are supported in a horizontal position by oblique braces Y Y, having flanged ends where they are bolted to the side bars and to base A''. A transverse brace and tube-rest E is bolted at its ends to the side bars between the dies and tube-holder, and serves to support the tube in a horizontal position while being subjected to the action of the swaging-dies. The side bars B are provided at their outer ends with shoulders *b* and with threaded studs, which pass through holes in the ends of the cross-bar F, and in which they are secured by nuts *a a*. The cross-bar F is provided at its central portion with a screw-threaded bearing, preferably in the form of a nut or bushing *f*, inserted in a suitable opening and held in place by a nut or collar *f'*, and in such bushing is inserted the hollow feed-screw H. This hollow screw H has secured to its inner end the hollow tube-holding chuck K, which is formed with a slightly tapered or conical socket for adapting it to grip and hold the end of the tube by frictional contact.

The hollow chuck K may be made integral with the feed-screw, as shown in Fig. 1, or may be detachably connected thereto by bolts, as shown in Fig. 2. According to the construction shown in Fig. 2, the end of the feed-screw is provided with a circular flange or disk having a short central squared or angular boss for fitting in a recess of like shape in the back of the chuck, and the chuck is secured to such disk by bolts *k*. With this construction different-sized chucks for accommodating different-sized tubes may be easily applied to the feed-screw. The chuck has a tapering or conical socket larger at the mouth than the tube to be gripped and of gradually-decreasing diameter until it is smaller than the tube. This tapering socket provides adjustability for small variations in the tubes, and, while serving to tightly grip the tube, provides for the requisite degree of flexibility or movement between the tube and chuck to very much diminish and deaden the transmission of the vibration (caused by the swaging-dies) from the tube to the feed-screw.

In order to provide for quickly and conveniently releasing the tube from the chuck, I loosely fit in the socket of the chuck the plunger $l$, secured to the end of the rod L, which is inserted in the bore of the feed-screw. The rod L is made with a plane surface, and may extend either entirely through the feed-screw and beyond its front end, as shown in Fig. 2, or may terminate within the screw, as shown in Fig. 1, depending upon the way in which its operating screw-rod is mounted and arranged in the machine.

The plunger $l$ is adapted to work freely in the socket of the chuck and to bear against the end of the tube when in position, and the rod L is adapted to freely move longitudinally in the hollow feed-screw. Obviously a tube may be released from the chuck by pressure upon the end of the plunger-rod, such as by a blow with a hammer or other implement, or by pressure with a screw-rod, or by running the feed-screw backward till the end of the plunger-rod strikes against a fixed stop. The screw-rod L' for operating the plunger may be mounted in the internally-screw-threaded end of the hollow feed-screw, as shown in Fig. 1, or in a separate support, as a cross-bar or yoke $m$, attached to the side frames of the machine, as shown in Fig. 2. In either case the releasing plunger and rod may be forced forward by turning screw-rod L' inward through its screw-threaded bearing. The outer end of rod L is provided with a handle $l'$ for turning it. In the hand-machine, Fig. 1, the end of the feed-screw H is provided with an operating-handle $h$, secured by a nut, as shown.

In the power-machine, Fig. 2, the plunger-rod L is preferably extended out beyond the front end of the feed-screw in position to strike against the end of an adjustable stop when the feed-screw is run backward. The adjustable stop consists of a screw-rod L', preferably having a flange or head at its inner end and supported in a screw-threaded bearing in the fixed cross-bar or yoke $m$. A jam-nut $n$ is provided for holding the rod L' in any desired position. The cross-bar or yoke $m$ is bolted or pivoted to the side frames of the movable carriage D. By this construction it is evident that screw-rod L' will act as a fixed step to arrest the backward movement of the releasing-plunger L as the feed-screw is run backward, thus automatically releasing the tube from the chuck.

In the power-machine I substitute a slotted extended base or bed-plate B' for the side bars B in the hand-machine, and such extended base or bed-plate may be bolted to the base A''. An adjustable frame or carriage D for supporting the feed-screw and its operating mechanism is mounted upon the bed-plate and adjustably secured thereto by headed bolts $e$, which pass through a central longitudinal slot in the top of the bed-plate. In practice the bed-plate is provided with suitable guideways along the side, which are embraced by overlapping flanges projecting from the carriage. This construction, however, is not fully shown, since it forms no part of my present invention. The carriage is provided in front with a standard F', which answers the same purpose as the cross-bar F in the hand-machine, and carries the screw-threaded bushing $f$, held in place by a collar $f'$, as previously described.

The hollow feed-screw, the tube-holding chuck, the releasing-plunger, and rod are the same in construction and operation, as heretofore described. In order, however, to properly connect the worm-wheel W to the feed-screw, the latter is provided with a longitudinal spline-groove extending nearly its whole length and adapted to receive a feather or spline $u$. The long hub $w$ of the worm-wheel is fitted within a capped journal-box $r$, supported by standards F'', and is made plain on the inside, except that it has a longitudinal groove for receiving the spline or feather $u$, and by it is connected to the feed-screw, thus permitting longitudinal motion of the feed-screw through the hub, though the screw is caused to revolve with the worm-wheel. The worm-wheel W receives motion from a worm T, the ends of which are journaled in suitable side boxes $t$ in the usual manner. A driving-pulley $x$ is secured to one end of the shaft of the worm T, and such pulley can be connected by a belt with suitable pulleys and shafts adapted to impart rotary motion to it in either direction at the will of the operator. I prefer to so connect the feed-operating shaft with a driving-power that the retrograde movement of the feed-screw H will be quicker than the forward movement. It will be understood that rotation of the feed-screw by motion of the worm-wheel and worm will cause such screw to be traversed back and forth through the screw-threaded nut or bushing $f$, thereby moving the chuck toward or from the swaging-dies. A tube-rest E is secured by nuts in the longitudinal slot $c$ of the bed-plate and can be adjusted in any suitable position in such slot for best supporting the tube when it is being subjected to the action of the swaging-dies.

The operation of the machine is very simple and can now be understood. The tube to be swaged is first heated at one end to the proper working temperature, and then its opposite end is inserted in the chuck K, where it is securely held by frictional contact. The tube will rest upon the support or rest E, and its inner end will be centered just within the semi-conical dies. For the purpose of engaging the tube by the chuck, it may first be laid upon the tube-rest and the feed-screw and chuck moved up to its rear end until it is grasped by the conical chuck, and then by continued rotation of the feed-screw the tube is gradually fed in between the semi-conical dies. The upper swaging-die being in operation will quickly swage the end of the tube into a tapered or conical form, which operation can be completed in this machine with one heat. After the end of the tube is properly swaged into a conical form the feed-screw H is turned to the left, thus withdrawing the tube from the dies. If the power-machine is being used, the feed-screw is turned backward until the plunger-rod L strikes the fixed stop, composed of the screw-rod L', and pushes forward the plunger, thereby releasing and shoving the tube out of the tapered chuck K. In case the hand-machine is being used and the feed-screw has been turned to the left for withdrawing the tube from the dies, the screw-rod L' is then quickly turned, so as to bear upon rod L, and thereby force plunger l against the end of the tube, thus releasing it from the tapered socket of the chuck. The operation of releasing the tube from the chuck is quickly and easily performed in either machine.

I wish it to be understood that in connection with either machine I may use a fixed support and screw-threaded bearing for the screw-rod L', and in either case such rod may be turned forward by hand for forcing the plunger and its rod forward to release the tube from the chuck, and in either machine the backward movement of the feed-screw may cause the plunger-rod to strike against the fixed screw-rod or other stop for automatically releasing the tube from the chuck.

The operation of swaging and releasing the tube is quickly performed. A tube can be readily and quickly placed in the machine. The forward motion of the feed-screw is continuous from the time the tube is inserted until the completion of the swaging operation. The retrograde movement of the feed-screw is rapidly performed and is continuous until the feed mechanism is stopped, and the tube on being released from the chuck may be quickly removed and replaced by a new one.

The tapered or conical ends imparted to the tubes in this machine can be closed by welding into a hemispherical form in a subsequent operation by a suitable machine. The tubes, after having their ends closed by welding the metal upon itself, are used in the well-known "porcupine boiler."

Having described my invention, what I claim, and desire to secure by Letters Patent, is—

1. In a machine for swaging metal tubes, a feed mechanism consisting of a screw-threaded bearing, a hollow feed-screw fitted to work in such threaded bearing, a chuck at the inner end of the feed-screw provided with a tapering socket for receiving and holding the outer end of the tube to be swaged, a tube-releasing plunger within the chuck, and the plunger-rod passing through and fitted to slide longitudinally in the hollow feed-screw, substantially as set forth.

2. In a machine for swaging metal tubes, a feed mechanism consisting of a screw-threaded bearing, a hollow feed-screw fitted to work in such threaded bearing, a chuck at the inner end of the feed-screw provided with a tapering socket for receiving and holding the outer end of the tube to be swaged, a releasing-plunger within the chuck, the plunger-rod passing through and fitted to slide longitudinally in the hollow feed-screw, and a rod held near the outer end of the plunger-rod and adapted to operate upon the plunger-rod and plunger to release a tube from the chuck, substantially as set forth.

3. In a machine for swaging metal tubes, a feed mechanism consisting of a screw-threaded bearing, a hollow feed-screw fitting to work in such threaded bearing, a chuck at the inner end of the feed-screw provided with a tapering socket for receiving and holding the outer end of the tube to be swaged, a releasing-plunger within the chuck, the plunger-rod passing through and fitted to slide longitudinally in the hollow feed-screw, and a screw-rod working in a threaded portion of the hollow feed-screw and adapted to be moved against the end of the plunger-rod to cause the plunger to release a tube from the chuck, substantially as set forth.

4. In a machine for swaging metal tubes, a feed mechanism consisting of a screw-threaded bearing, a feed-screw fitted to work in such bearing, and a chuck having a tapering socket adapted to hold the tube by frictional contact of the inner wall of the chuck with the end of the tube and arranged at the inner end of the feed-screw adapted to receive and hold the outer end of the tube to be swaged, substantially as set forth.

5. In a machine for swaging metal tubes, a feed mechanism consisting of a screw-threaded bearing, the hollow feed-screw H, fitted to work in such bearing, means on the feed-screw for turning it, the tube-chuck K at the inner end of the feed-screw, such chuck having a tapering socket, the tube-releasing plunger l, located within the socket of the chuck, the plunger-rod L, and the screw-rod L', having a handle secured thereto, substantially as set forth.

6. In a machine for swaging metal tubes, a feed mechanism consisting of a screw-threaded bearing, a feed-screw fitted to work in such bearing and provided with a chuck having a tapering socket for holding the tube, a worm-wheel fitted on the feed-screw, a spline-and-groove connection between the worm-wheel and the feed-screw, and the worm fitted to rotate in bearings and meshing in the worm-wheel, substantially as set forth.

7. In a machine for swaging metal tubes, a feed mechanism consisting of a screw-threaded bearing, a hollow feed-screw fitted to work in such bearing, a chuck at the inner end of the feed-screw provided with a tapering socket for receiving and holding the outer end of the tube to be swaged, a releasing-plunger within the chuck, the plunger-rod passing through and fitted to slide longitudinally in the hollow feed-screw, a stop arranged to come in contact with the plunger-rod and release the tube when near the end of the backward stroke of the feed-screw, a worm-wheel fitted on the feed-screw, a spline-and-groove connection between the worm-wheel and feed-screw, and a worm fitted to rotate in bearings and meshing in the worm-wheel, substantially as set forth.

In testimony whereof I affix my signature in presence of two witnesses.

JOHN P. KENNEDY.

Witnesses:
RICHD. D. PLATE,
RICHARD S. DAYTON.